W. YOST.
WEIGHING SCALE BEAM.
No. 14,382. Patented Mar. 4, 1856.
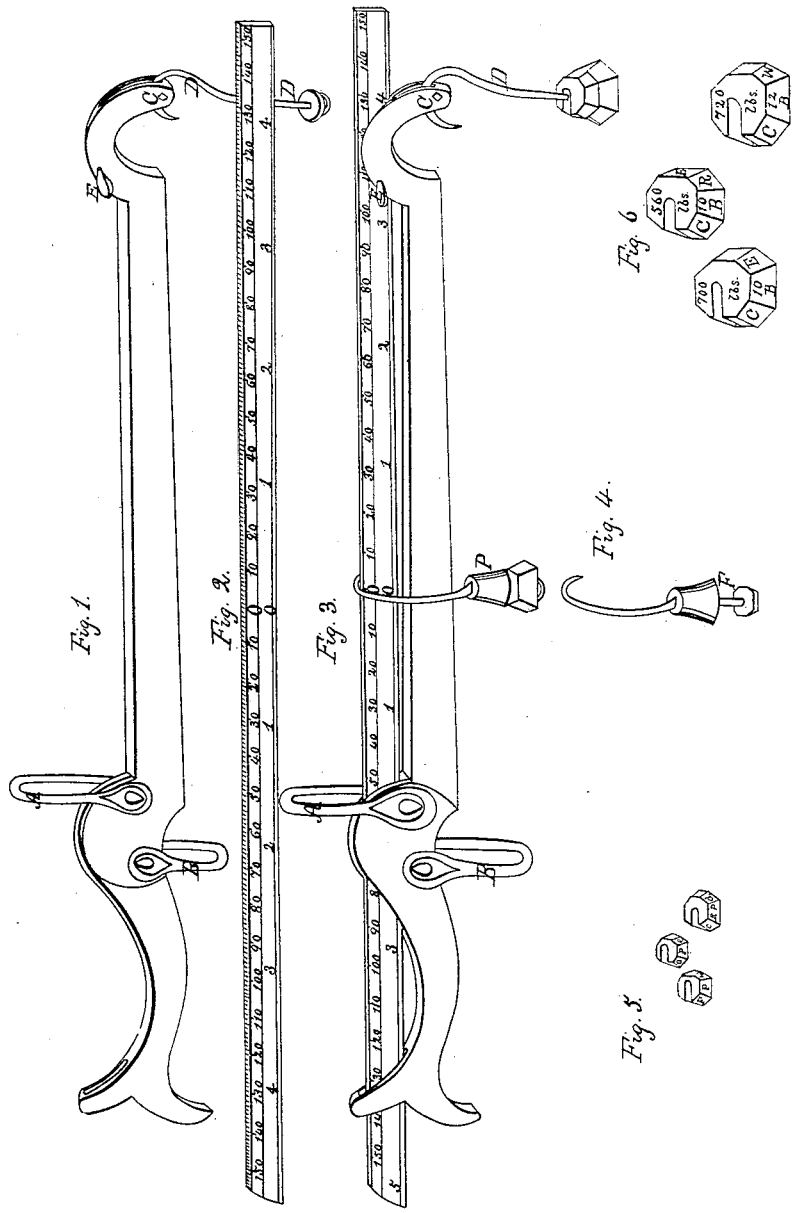
Witnesses.
Inventor:
Wm Yost.

UNITED STATES PATENT OFFICE.

WM. YOST, OF GOSHEN, OHIO.

WEIGHING-SCALE BEAM.

Specification of Letters Patent No. 14,382, dated March 4, 1856.

*To all whom it may concern:*

Be it known that I, WM. YOST, of Goshen, in the county of Clermont and State of Ohio, have invented a new and useful Improvement in Scale-Beams; and I do hereby declare that the following is a full, clear, and exact description thereof, reference being had to the accompanying drawings and the letters of reference marked thereon.

The nature of my invention consists in providing the common beam with a sliding index, *a* P, with additions, and a set of weights, so arranged and worked as to show when used the net weight of any and all articles by it weighed. Also in measuring grain and other things which are calculated by the bushel, it will tell the net number of bushels, instead of pounds, and in either case the tare, when there is any, is, by the beam subtracted from the gross, thereby leaving the net article in pounds, or, bushels as may be desired, without the operator having to make any arithmetical calculations either to subtract the tare, or to reduce to bushels.

To enable others skilled in the art to make and use my invention I will proceed to describe its construction and then my manner of using it.

I construct my beam of brass. The main body of it, (Figure 1,) is 23 inches long. From the pendent clevis (A in Fig. 1) to the clevis which receives the weight seen at (B, in Fig. 1,) is $1\frac{3}{8}$ inches, and from the clevis, A, to the pin, C, at the point of the beam (in Fig. 1,) is $18\frac{3}{8}$ inches, so that the beam, thus far, is made like the common beam furnished with clevises, a pendent hook, (D, in Fig. 1), at the point of the beam, saving, there are no notches or figures on this part of the work. In the upper part of this beam so arranged I cut a groove to receive my slide or index, (Fig. 2). This slide I make also of brass, one eighth of an inch in thickness by $\frac{5}{8}$ in. width and 25 inches long. This plate or slide is finished with notches on the edge and two sets of figures on the side. The smallest or lowest figures (in point of value) are placed next the center, and increase in value both right and left. The upper set of figures are used for counting ounces, pounds, &c., while the lower set are used for counting bushels, pecks, quarts, &c. My index thus prepared is placed within the groove and there made fast when need be, by means of a small screw (E, in Fig. 1).

The P (Fig. 4), I make of iron; its weight is $12\frac{3}{4}$ ounces; it has a stem or shaft left plain and small near the bottom, in order to be convenient to receive additions for bushel calculation. These additions are seen in a group at Fig. 5; and the group at 6 are the weights which go on the pendent hook D (in Figs. 1 and 3). In Fig. 3 may be seen the whole beam, the P at 0, with one addition on it filling the vacancy in it, seen at 4, F, and on the pendent hook, D, may be seen two weights. My additions to the, P, weigh nearly as follows: Oats, ad. 0; barley, $6\frac{1}{4}$ ounces; corn, rye, and flax seed, 9 ounces; wheat and clover seed, $12\frac{1}{8}$ ounces; and for corn in the ear the addition weighs about $15\frac{1}{2}$ ounces. These additions and the weights are all made with slots or openings in the side so as to slide conveniently on the stems which receive them, to wit: D, and F, the size of all the weights arranged to suit the draft we wish to make.

The index differs from all others in this, the numbers commence at the center, and not at the end of the beam; by this means I can weigh what I take off as well as what I add; it also differs in this, again, it subtracts the tare from the gross and tells the net weight only. It also differs in another point, it weighs articles calculated by the bushel, subtracts the tare, and tells the amount in bushels, pecks, quarts, lb. It differs again from scales which possess some of these qualities, by possessing all and also by performing all without any friction, or at least without adding any friction to any of its working parts. It differs again in this, in railroad cars and other vessels that carry burdens the car or other vessel may stand on the platform while loading and yet the different articles may be placed on the car and there correctly weighed, without reference to the weight of the car or other articles upon it.

I will now proceed to describe its use, or, my manner of using it in loading a car. First, place the car on the platform of the scales; I then balance the whole by adding (if need be) weights to the pendent hook (D), and moving my sliding index (Fig. 2) outward from the fulcrum or clevis (A, Fig. 1) toward the point of the beam, always in balancing (before weighing) keeping the P at 0. I then add my loading what I want, and weigh as on other scales; this operation gives the net weight of your addition. If I wish to add more, I again balance, place the P at 0, and begin anew. In unloading, I do the same work, and in the same manner, only when the P is moved on the index it is carried toward the fulcrum (or clevis A,) and not from it, and as the figures increase from 0, both right and left, I can weigh what I take off as well as what I put on. When I wish to weigh bushels I place an addition on the stem of the P of such size as shall suit the kind of grain I wish to weigh. I then proceed precisely as in common weighing, saving I run 32 notches for a bushel and the lower row of figures correspond with this calculation, so that every notch for lbs. is equal to one quart, eight to the peck and 32 to the bushel. These additions to the P are marked so as to be known either by the word or, letter as will be seen in the model.

The weights for the hook, D, are larger than the additions for the P and are marked so as to show the weight they will balance in lbs., also to show the bushesls they will draw of the several kind of grain. They are designed to show the tens, hundreds, thousands, &c., of lbs. or bushels weighed and the P and index will show the ounces, lbs., quarts, pecks, and bushels weighed. By means of this scale the operator is saved the trouble of subtracting the tare and reducing to bushels. He is also saved the trouble of balancing his scale before placing his gross weight on the platform, and may leave his vessel on the scale while loading or unloading.

I have here described a particular size to which I do not wish to confine myself, but to make beams of such size and shape as to suit purchasers, adhering still to the principle here laid down.

What I claim as my invention and desire to secure by Letters Patent is—

The index marked from the center both right and left together with the P and its additions and weights for grain measure.

WM. YOST.

Witnesses:
THOS. D. ROYSE,
J. H. HALL.